Patented Oct. 7, 1930

1,777,833

UNITED STATES PATENT OFFICE

ANTONIO FERRETTI, OF MILAN, ITALY, ASSIGNOR TO SOCIETÁ INVENZIONI BREVETTI ANONIMA TORINO, OF TURIN, ITALY

TREATING OF ANIMAL-SKIN PRODUCTS

No Drawing. Original application filed May 24, 1929, Serial No. 365,780, and in Italy July 14, 1928. Divided and this application filed July 15, 1930. Serial No. 468,123.

This invention relates to a process of treating animal skin materials or animal skin products, as distinguished from the treatment of wool, hair, etc., and has for one of its objects the provision of a process adapted for utiliziing the scraps and cuttings of tanned hides particularly mineral tanned hides whereby such materials may be converted into a useful and valuable product which in appearance, fibrous texture and flexibility resembles natural leather.

It will at once be apparent that my invention is of great economical value in that it salvages or utilizes materials which heretofore have generally been converted into glues or fertilizers or simply thrown away.

In the practice of my invention, particularly when employing scraps and cuttings of chrome tanned leather from which the acid has not yet been removed, the material is first subjected to a preliminary neutralization by treatment with an alkaline salt of a weak acid such as neutrol, (a composition ⅔ bicarbonate of soda and ⅓ sodium sulphate), borate of sodium sodium hyposulfite, bicarbonate of soda and the like, either separately or combined, at a temperature between 30° and 60° C., for example.

The material is then washed and mechanically and intimately admixed with an aqueous medium until a slurry with the fibers of the material in suspension is obtained.

I then add a detanning agent to the slurry such as an organic detanning salt, this material being added either to the suspension or during the admixing of the fibers with the aqueous medium and preferably after the neutralization above referred to. Examples of an organic detanning salt suitable for my purpose are Seignette's salt (sodium potassium tartrate), cream of tartar (acid potassium tartrate) and other organic detanning salts.

I then add to the slurry a suitable grease or oil, these terms being used synonymously, the type of grease or oil employed being one capable of emulsifying when added to water. Chromine is an example of such a material and is preferably added at a temperature between 30° and 60° C.

I also add to the slurry a suitable binding material miscible with water prior to the coagulation of the binder of the binding material. The binder of the binding material is water insoluble and examples of a suitable binding material to be employed are india rubber latex, gutta percha latex, balata latex or the like as obtained from the trees and which may have been preserved by ammonia or any other suitable alkaline preserving material. A synthetic latex or other binding material containing a water insoluble binder and which is in suitable condition for incorporation in the slurry may be substituted for the latices above mentioned.

I find also that the addition of a certain amount of soap to the grease or oil is of advantage particularly when using chromine to prevent objectionable shrinkage of the previously detanned fibers.

As a preservative for the latex, if the latex be employed as a binder, I add a small amount of vegetable tanning agent to the slurry, this tanning agent being added prior to the addition of the latex.

I find also that the addition of commercial sodium chloride or its equivalent to the slurry is of advantage, this material containing magnesium and calcium chloride and other impurities and promoting the abstracting of the liquid of the slurry and being of material advantage in the making of sheets of substantial thickness.

I find also that if the sodium chloride is added directly after the latex and before abstracting the liquid the process and the product are improved.

The slurry is then deposited upon a finely perforated support such as a wire gauze, for example, where the liquid of the slurry is abstracted so that a fibrous mass containing a water insoluble binder is obtained. This mass is then rolled and pressed and subjected to the usual finishing operations employed in the finishing of natural leathers.

This application is a division of my copending application Serial No. 365,780, filed May 24, 1929.

What I claim is:—
1. The process which comprises treating mineral tanned animal skin products with a neutralizing agent, washing, effecting an intimate admixture of the material thus obtained and an aqueous medium until a flowing slurry with the tanned fibers of the animal skin products in suspension is obtained, treating with a detanning agent, adding to the detanned slurry a grease and thereupon a small amount of vegetable tanning agent and latex, and abstracting the liquid of the slurry.

2. The process which comprises treating mineral tanned animal skin products with a neutralizing agent, washing, effecting an intimate admixture of the material thus obtained and an aqueous medium until a flowing slurry with the tanned fibers of the animal skin products in suspension is obtained, treating with a detanning agent, adding to the detanned slurry a grease, a small amount of vegetable tanning agent, latex and sodium chloride, and abstracting the liquid of the slurry.

3. The process which comprises treating mineral tanned animal skin products with a neutralizing agent, washing, effecting an intimate admixture of the material thus obtained and an aqueous medium until a flowing slurry with the tanned fibers of the animal skin products in suspension is obtained, treating with a detanning agent, adding to the detanned slurry a grease and a soap and thereupon a small amount of vegetable tanned agent and latex, and abstracting the liquid of the slurry.

4. The process which comprises treating mineral tanned animal skin products with a neutralizing agent, washing, effecting an intimate admixture of the material thus obtained and an aqueous medium until a flowing slurry with the tanned fibers of the animal skin products in suspension is obtained, treating with sodium potassium tartrate, adding to the detanned slurry a grease and thereupon a small amount of vegetables tanning agent and latex, and abstracting the liquid of the slurry.

This specification signed this 21st day of June, 1930.

ANTONIO FERRETTI.